United States Patent
Zhang et al.

(10) Patent No.: US 7,298,923 B2
(45) Date of Patent: Nov. 20, 2007

(54) METHOD AND SYSTEM FOR FOCUS-ADAPTIVE RECONSTRUCTION OF SPINE IMAGES

(75) Inventors: Bohong Zhang, Lexington, KY (US); Li Zhang, Skillman, NJ (US); Ming Fang, Princeton Jct., NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 543 days.

(21) Appl. No.: 10/974,503

(22) Filed: Oct. 27, 2004

(65) Prior Publication Data

US 2005/0213850 A1 Sep. 29, 2005

Related U.S. Application Data

(60) Provisional application No. 60/516,793, filed on Nov. 3, 2003.

(51) Int. Cl.
*G09K 9/32* (2006.01)
*G09G 5/00* (2006.01)
*G06K 9/36* (2006.01)

(52) U.S. Cl. .................... 382/294; 345/639

(58) Field of Classification Search .............. 382/294, 382/284, 286, 296; 358/540, 450; 345/629, 345/631, 634, 637, 639, 640
See application file for complete search history.

(56) References Cited

U.S. PATENT DOCUMENTS

| | | | |
|---|---|---|---|
| 5,920,657 A * | 7/1999 | Bender et al. | 382/284 |
| 6,101,238 A | 8/2000 | Murthy et al. | |
| 6,393,163 B1 * | 5/2002 | Burt et al. | 382/294 |
| 6,757,418 B2 | 6/2004 | Wei et al. | |
| 7,088,850 B2 * | 8/2006 | Wei et al. | 382/128 |
| 7,127,090 B2 * | 10/2006 | Kreang-Arekul et al. | 382/128 |

* cited by examiner

*Primary Examiner*—Yon J. Couso
(74) *Attorney, Agent, or Firm*—Michele L. Conover

(57) ABSTRACT

A method for aligning a pair of digital images includes providing a pair of digital images, wherein each said image comprises a plurality of intensities corresponding to a domain of points in a D-dimensional space, and the pair of images present adjacent views of a same object of interest. A weighting function is applied to each image of the pair of images, wherein the weighting function is centered on the object of interest, the weighting function has a maximum value on the object of interest, and the value of the weighting function decreases with increasing distance from the object of interest. The pair of images is aligned by correlated the weighted intensities on one image with those in the other image.

29 Claims, 11 Drawing Sheets

METHOD AND SYSTEM FOR FOCUS-ADAPTIVE RECONSTRUCTION OF SPINE IMAGES

CROSS REFERENCE TO RELATED UNITED STATES APPLICATIONS

This application claims priority from "Focus-adaptive Method for MR Spine Composer", U.S. Provisional Application No. 60/516,793 of Zhang, et al., filed Nov. 3, 2003, the contents of which are incorporated herein by reference.

TECHNICAL FIELD

This invention is directed to methods of constructing a composite image volume from several ordered constituent volumes of medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

In many diagnostic imaging situations, the target object to be imaged is much larger than the field of view of the imaging device. Even when it is possible to increase the field of view to cover the whole target object, the resulting image has insufficient resolution or possible geometric distortions in the off-center areas. It may also not be possible to cover the entire target object in one image because of the geometry or topology of the target object. It is nevertheless useful to present the entire target object in a single image to the human for the purpose of diagnosis. Moreover, it is important to compose the image with certain precision requirement for quantitative measurement in many clinical applications. For example, many musculoskeletal disorders such as scoliosis require the examination of the spine as a whole so that its geometry can be seen or measured. Due to the size of spine, it is currently not possible to acquire a single MR image of the entire spine without lowering resolution, adding significant distortions, or deteriorating contrast. In present radiological practice, partial, overlapping constituent images are taken at several stations along the spine, starting from the back of the head down to the pelvis. The overlaps between the images can vary. Seam positions between individual volumes need to be accurate for the composite volume to look reasonable. This is very important in clinical diagnosis. A composite volume with poor quality could cause difficulties in physician's diagnostic decision-making process. The ability to view the entire object on a single image facilitates convenient and accurate diagnostic examination and measurement.

The process of forming a compound image from overlapped, individual images is referred to herein as image composing. Prior systems for image composing include U.S. Pat. No. 6,101,238, titled "System for generating a compound x-ray image for diagnosis", issued on Aug. 8, 2000, and U.S. Pat. No. 6,757,418, titled "Method and system for automatic computed radiography (CR) image composition by white band detection and consistency rechecking", issued on Jun. 29, 2004. These patents disclose alignment of images using cross-correlation techniques and horizontal and vertical translations.

Magnetic resonance composing refers to the automatic constructing of one composite 3D volume from several constituent ordered 3D volumes of MR images. When imaging the spine, the scans are performed so that there is an overlap region in each image. Thus, when considering a pair of images, one of an upper portion and one of a lower portion of a spine, the lower part of the upper region should overlap with the upper part of the lower region. The images are composed by aligning voxels of the upper overlap region with corresponding voxels of the lower overlap region. One seeks to determine a cut-line in the overlap region, where one image ends and the next image begins. The goodness of the alignment can be determined by correlating one overlap region with the other. By shifting the alignment parameters of each pairs of volumes in a 3-D search range (horizontal, vertical and depth) and computing the correlation of all the possible alignments within the search range for the overlap parts of the volumes, the highest correlation can be automatically found and the corresponding alignment parameters returned as the best match for the pair of volumes.

In theory, this scheme should work well for ideally overlapped volumes. The best match always occurs exactly where the overlap parts of each pair of volumes completely match each other, which is corresponding to the highest correlation among all possible alignments. However in practice, when working with real data, this is not always true. If the original images are distorted in some way, it may not be possible to match all parts of the volumes simultaneously. In this case, the procedure can still return the highest correlation as 'the best match', which may not necessarily be the best match defined by a human.

SUMMARY OF THE INVENTION

In one aspect of the invention, there is provided a method for aligning a pair of digital images. The method includes providing a pair of digital images, wherein each said image comprises a plurality of intensities corresponding to a domain of points in a D-dimensional space, and the pair of images present adjacent views of a same object of interest, applying a weighting function to each image of the pair of images, wherein the weighting function is centered on the object of interest, the weighting function has a maximum value on the object of interest, and the value of the weighting function decreases with increasing distance from the object of interest, and aligning the pair of images by correlated the weighted intensities on one image with those in the other image.

In a further aspect of the invention, each image of the pair of images has an overlap region, and wherein the step of aligning is performed by correlating the weighted intensities in the overlap region of one image with the weighted intensities in the overlap region of the other image.

In a further aspect of the invention, the two images are joined into a composed image at a cutline in the overlap regions of the two images.

In a further aspect of the invention, the weighting function is applied to an image in the pair of images by multiplying the intensity of a point in the image by the value of the weighting function.

In a further aspect of the invention, the object of interest in each image is the spine.

In a further aspect of the invention, the object of interest in each image is an arm.

In a further aspect of the invention, the object of interest in each image is a leg.

In a further aspect of the invention, the images are magnetic resonance images.

In a further aspect of the invention, the weighting function is a Gaussian of the form $$P(x)=\exp(-x^2/2\sigma^2)$$

wherein the x-axis is along the image width direction, with the image center as x=0, where P(x)=1.0, and σ=width/6.

In a further aspect of the invention, the weighting function is of the form $$P(x)=\sigma^{2n}/(\sigma^{2n}+x^{2n}),$$

wherein the x-axis is along the image width direction, with the image center line defined as x=0, where P(x)=1.0, n can be any positive integer and σ=width/6.

In a further aspect of the invention, the weighting function is of the form $$P(x) = -\left(\frac{2}{w}\right)^{2n}\left(x^2 - \left(\frac{w}{2}\right)^2\right)^n,$$

wherein the x-axis is along the image width direction, with the image center line defined as x=0, where P(x)=1.0, n is any positive integer and w is the image width.

In a further aspect of the invention, the weighting function is of the form $$P(x)=\{-2x/w+1:0\leq x\leq w/2; 2x/+1:-w/2\leq x<0\},$$

wherein the x-axis is along the image width direction, with the image center line defined as x=0, where P(x)=1.0, and w is the image width.

In another aspect of the invention, there is provided a program storage device readable by a computer, tangibly embodying a program of instructions executable by the computer to perform the method steps for aligning a pair of digital images.

DETAILED DESCRIPTION OF THE PREFERRED EMBODIMENTS

Figure 1:
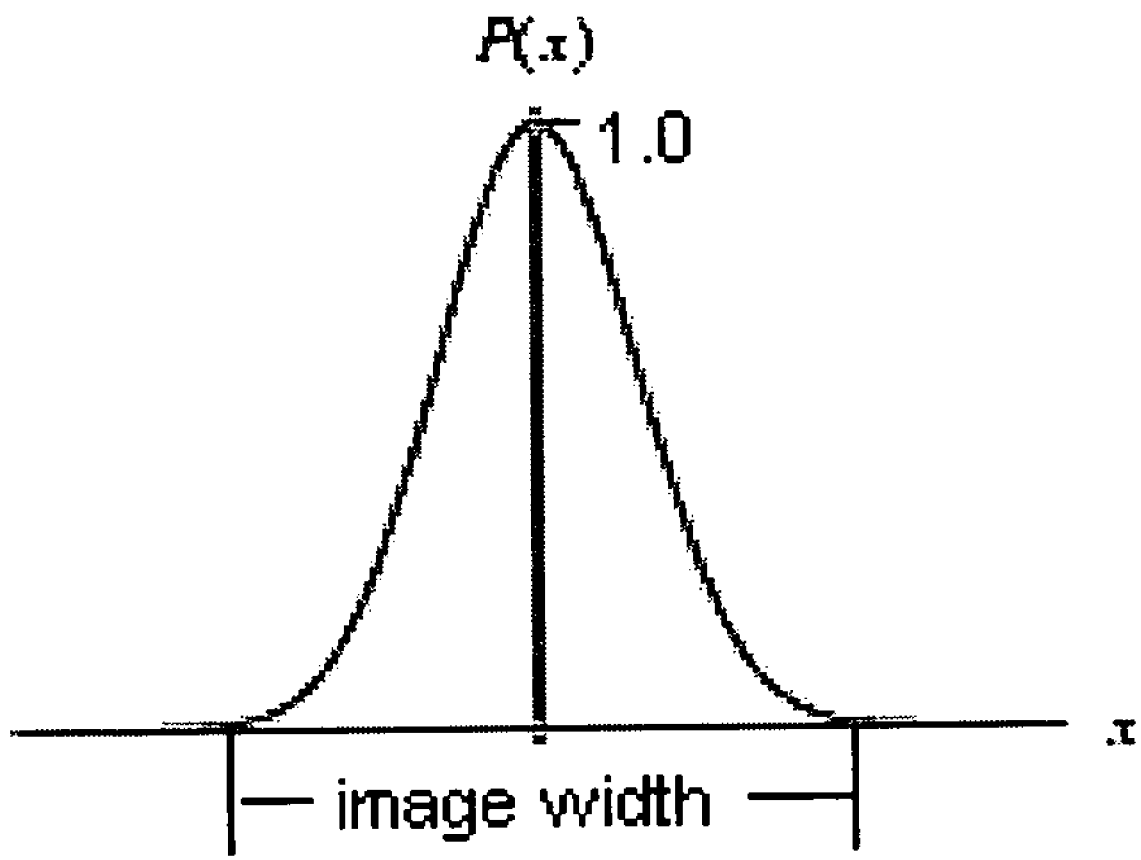
FIG. 1 depicts an exemplary Gaussian weighing curve.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The methods and systems disclosed herein can be adapted to reconstructing a composite volume from several constituent ordered volumes of organs or anatomical regions including, without limitation, the spine, and limbs such as arms and legs. The software application and algorithm disclosed herein can employ 2-D and 3-D renderings and images of an organ or anatomical system. For illustrative purposes, a spinal system is described. However, it should be understood that the method can be applied to any of a variety of other applications, such as the arms and legs, as is known to those skilled in the art.

In the reconstruction of spinal images, computing the correlation of all the possible alignments for the overlap regions of the volumes sometimes provides poor alignment results, as the spine is not always aligned by the automatic alignment parameters computed by the composing algorithm. It has been found that poor alignment can be caused by inconsistency of the volume pair overlaps.

The 3-D correlation method works well with ideal images, where overlapping parts of each pair of volumes are consistent. Here, the correlation method provides perfect alignment results for ideal input images. However for inconsistent images, there is no perfect match. One possible cause for the inconsistency is the process of distortion correction. Since MR machines can sometimes cause image distortions, the individual original MR image volumes need to be distortion-corrected before being sent as the inputs for the composing process. However, the distortion corrected images might not be consistent with real data. If input images are warped to some degree, it is not possible to find a perfect match between image pairs even by manual adjustment. For example, in the case of a sagittal dataset, there is frequently a bright stripe along the patient's back due to the surface coil used in the data acquisition. If the sagittal image happens to be distorted, it might be possible to match either the spine area, which is usually near the center of the image, or the stripe area, which is at the edge of the image, but not both simultaneously. Correlation computation, by its nature, favors matching large homogeneous areas over other areas. Therefore, the best alignment computed automatically by a pure 3-D correlation algorithm may tend to favor positions where the patient's back match. In this case, the highest correlation of a back image match is misleading, because the composed image is misaligned for the spinal area, which is the image portion of interest.

The methods presented herein, referred to as focus adapted methods, mimic the natural process of human manual adjustments for alignment parameters. When performing manual adjustments of spinal images, people tend to focus more on the part of the image where the spine is located, and not on the peripheral regions of the images, since the spinal area is more important for clinical diagnosis. In a focus adaptive method, which places more weight on the spinal area, the alignment of the spine automatically computed by the correlation process can be improved. Assuming that the spinal area is in the center of the image, pixels on the center line are given an image a weight of 1.0, and pixel intensities are gradually suppressed toward the left and right sides of the image. Note that the weight is applied only while computing alignment parameters, thus the image itself is not modified. Once the alignment parameters are obtained, the original images are composed according to these parameters.

Figure 10:
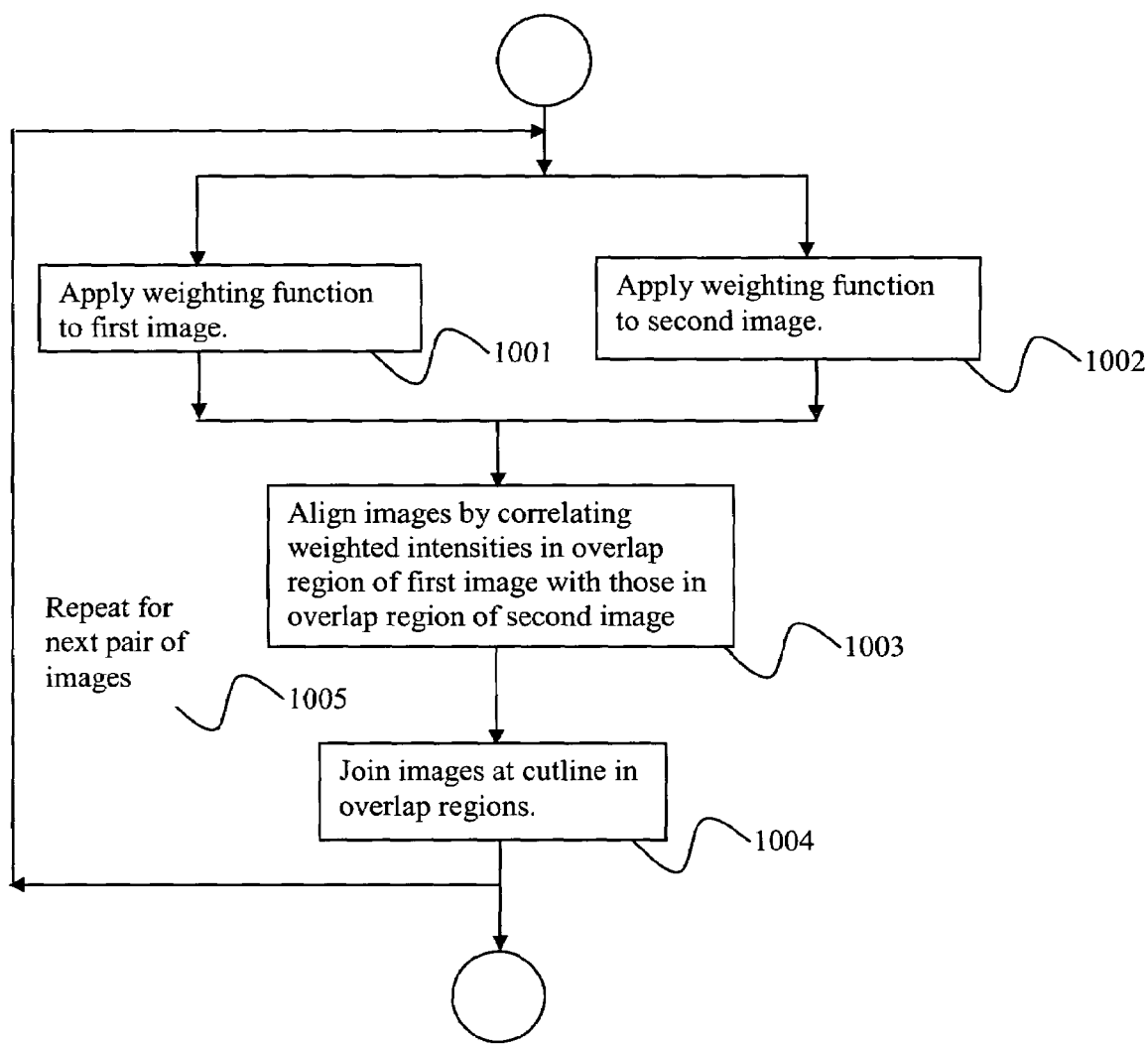
FIG. 10 depicts a flow chart of a preferred method of the invention.

Referring now to the flowchart depicted in FIG. 10, the weight function is applied at steps 1001, 1002 to each image of a pair of images to be aligned. The application of the weighting function can be performed by multiplying the intensity at each point in each image by an appropriate value of the weighting function. In one embodiment, the weighing curve chosen is a Gaussian distribution, depicted in FIG. 1. An exemplary Gaussian distribution $P(x)$ can be defined as $P(x)=\exp(-x^2/2\sigma^2)$. The X-axis can be taken to be along the image width direction, with the image center line defined as $x=0$, where $P(x)=1.0$, representing no suppression on the center line. To determine the shape of the Gaussian curve, i.e. how sharp the suppression should be, one needs to choose a value for the standard deviation, $\sigma$. In this embodiment, the standard deviation is chosen to be $+3\sigma$ at the right edge, and $-3\sigma$ at the left edge. Therefore, the total image width is $6\sigma$, i.e. $\sigma=\text{width}/6$. This value of $\sigma$ is for example only, and other values of $\sigma$ are possible and within the scope of the invention. The weight can be computed at every location along the image width direction and it can be applied to the image pixel values before computing the correlation value. After application of the weighting function to each of the two images, the images can be aligned as before by computing the correlation value at step 1003 for the weighted image values in the overlap regions of each image. The aligned images can then be joined at step 1004 at a cutline in the overlap regions. This method of applying a weight function to the images before correlating the overlap regions can be performed 1005 for each successive pair of images to be joined into the final composed image. By using this focus-adaptive method in spine images, more reasonable composing results can be obtained when the volume pairs are not completely consistent.

Note that other weighting distributions can be used for the focus adaptive method. In another embodiment, the weight function is of the form $P(x)=\sigma^{2n}/(\sigma^{2n}+x^{2n})$, where n can be any positive integer and $\sigma$ can be chosen as before. In another embodiment, the weight function is of the form $$P(x) = -\left(\frac{2}{w}\right)^{2n}\left(x^2 - \left(\frac{w}{2}\right)^2\right)^n,$$

where again n is any positive integer and w is the image width. In another embodiment, the weight function is of the form $P(x)=\{-2x/w+1:0\leq x\leq w/2 \ /2x/w+1:-w/2\leq x<0\}$, with w being the image width. These weight functions are exemplary, and any weight function that has a maximum value at a line of reflection in the image, and whose value decreases monotonically with increasing distance from the line of reflection, is within the scope of the invention. Although the example functions presented here are symmetric with respect to the reflection axis, this is not an absolute requirement, as long as the weighting decreases with increasing distance from the reflection axis.

Test results show the performance improvement by using the focus-adaptive methods of the invention. For those datasets that had satisfactory performance with the original composing algorithm, using focus-adaptive method will not affect the original alignment results.

Figure 2:
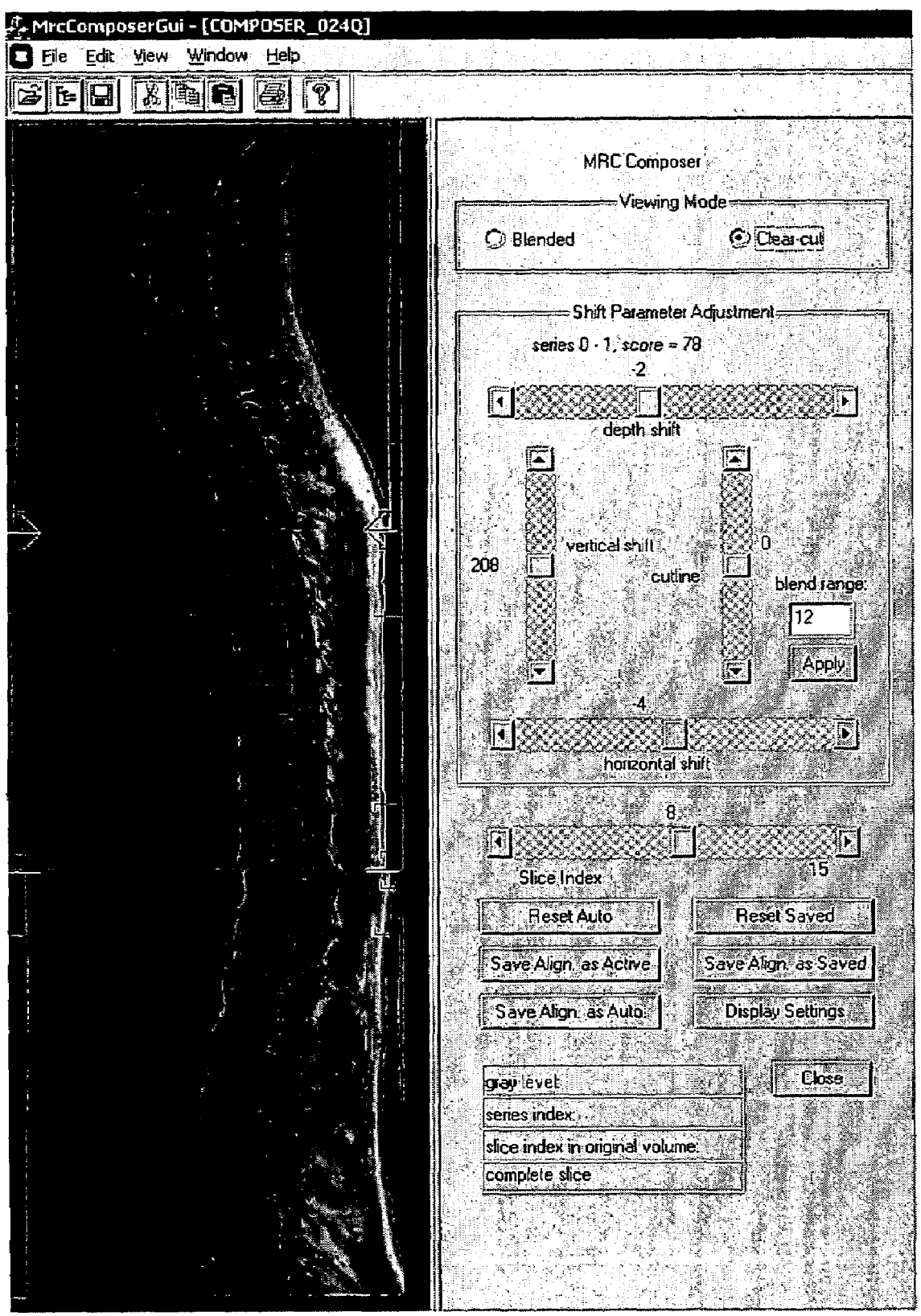
FIG. 2 depicts the result of a dataset with the original composing method.
Figure 3:
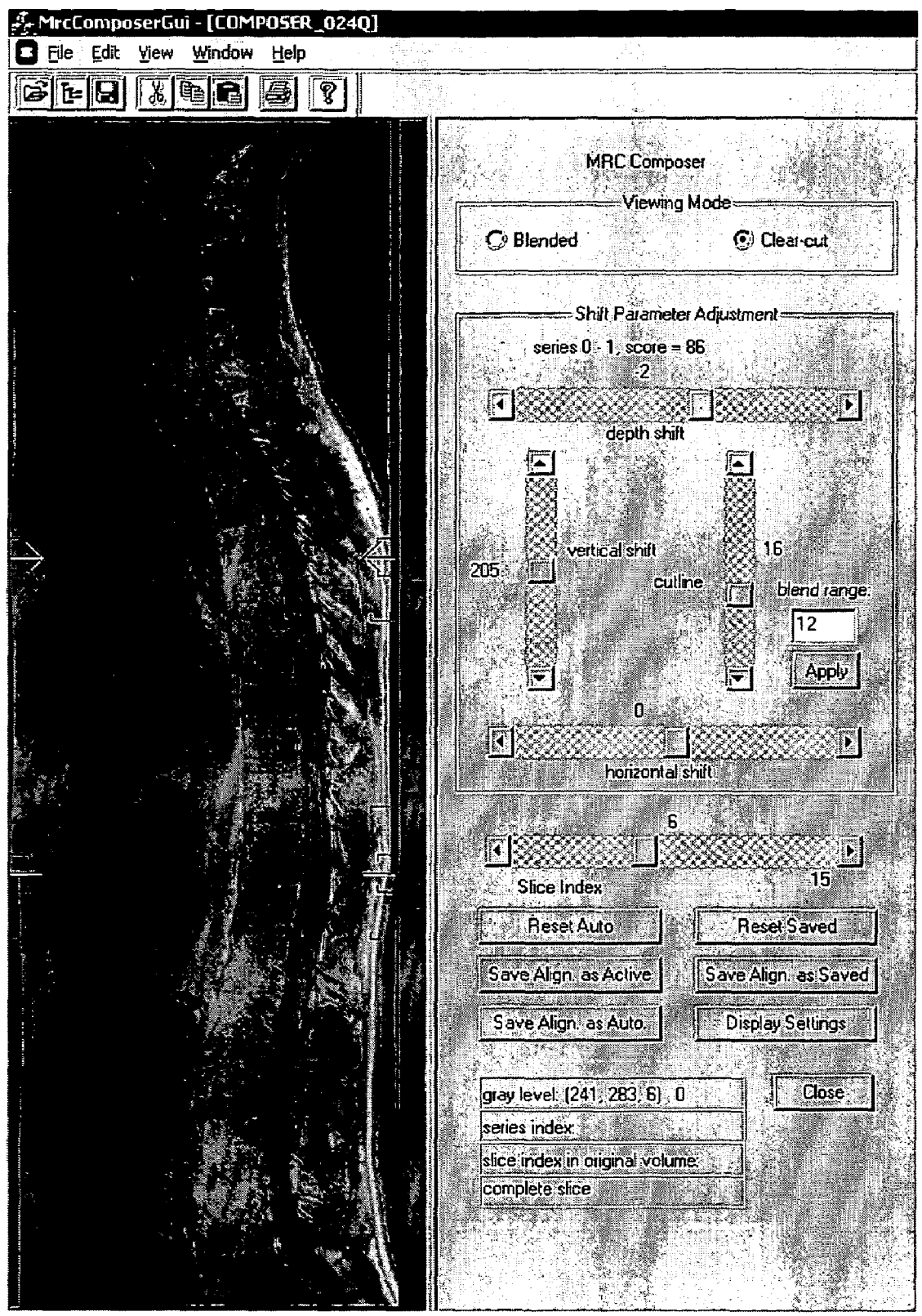
FIG. 3 depicts the result using a focus-adaptive method on the same dataset as depicted in FIG. 2.

A first example uses a dataset in which the images were distortion-corrected, but where the distortion correction parameters were not correctly chosen. This caused the images to be strongly distorted. This extreme case is used to show how the focus-adaptive method can successfully overcome image distortion and still produce reasonable and robust alignment results. FIG. 2 shows the alignment result with the original method. In clear-cut mode, the composing results are poor, with the spine not at all aligned. FIG. 3 depicts the result obtained on the same dataset by applying the focus-adaptive methods disclosed herein. As can be seen, the composed image in FIG. 3 is of much better quality.

Figure 4:
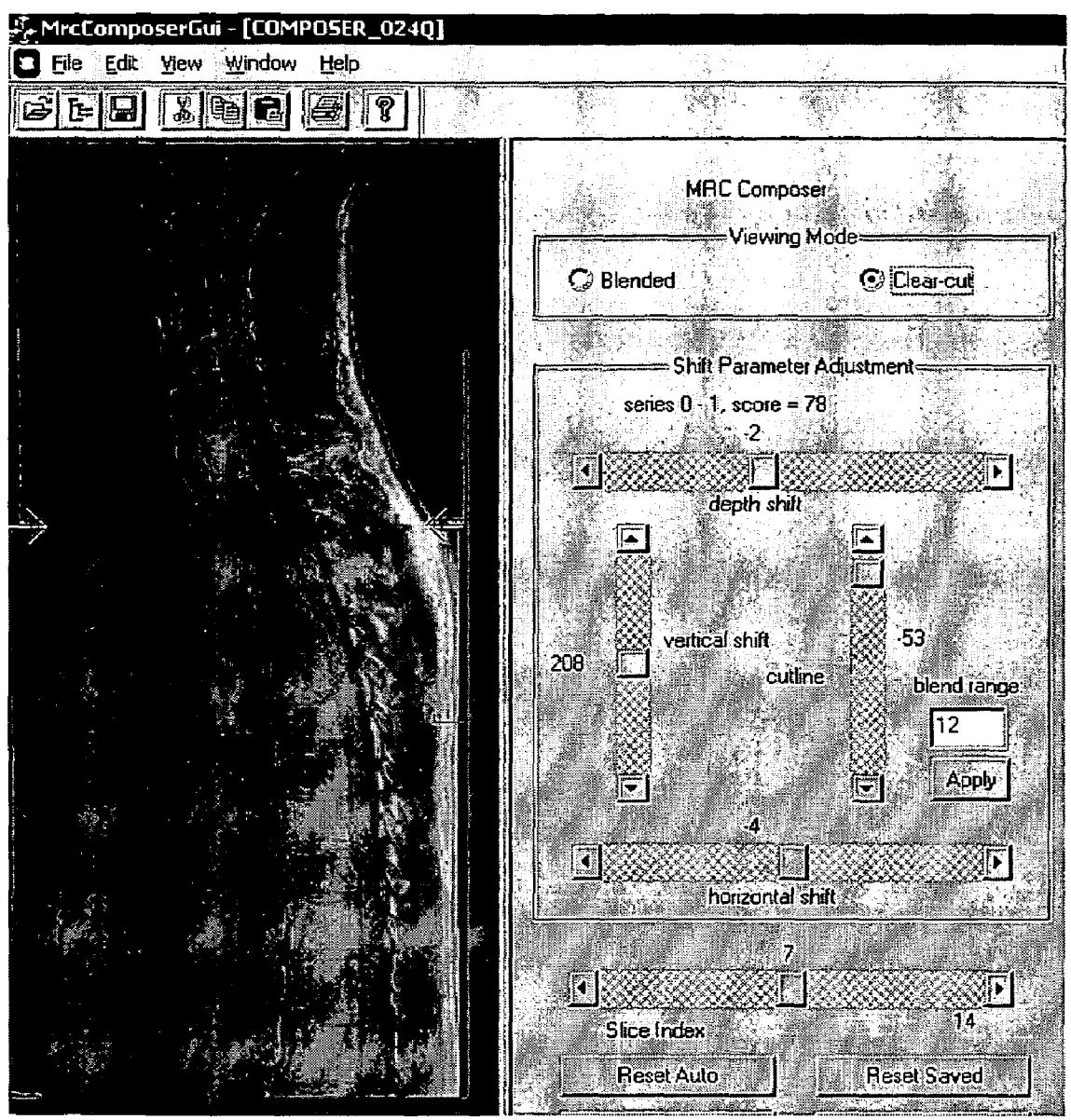
FIG. 4 depicts the result for the c-spine and t-spine, using the original composing method and the dataset of FIGS. 2 and 3.
Figure 5:
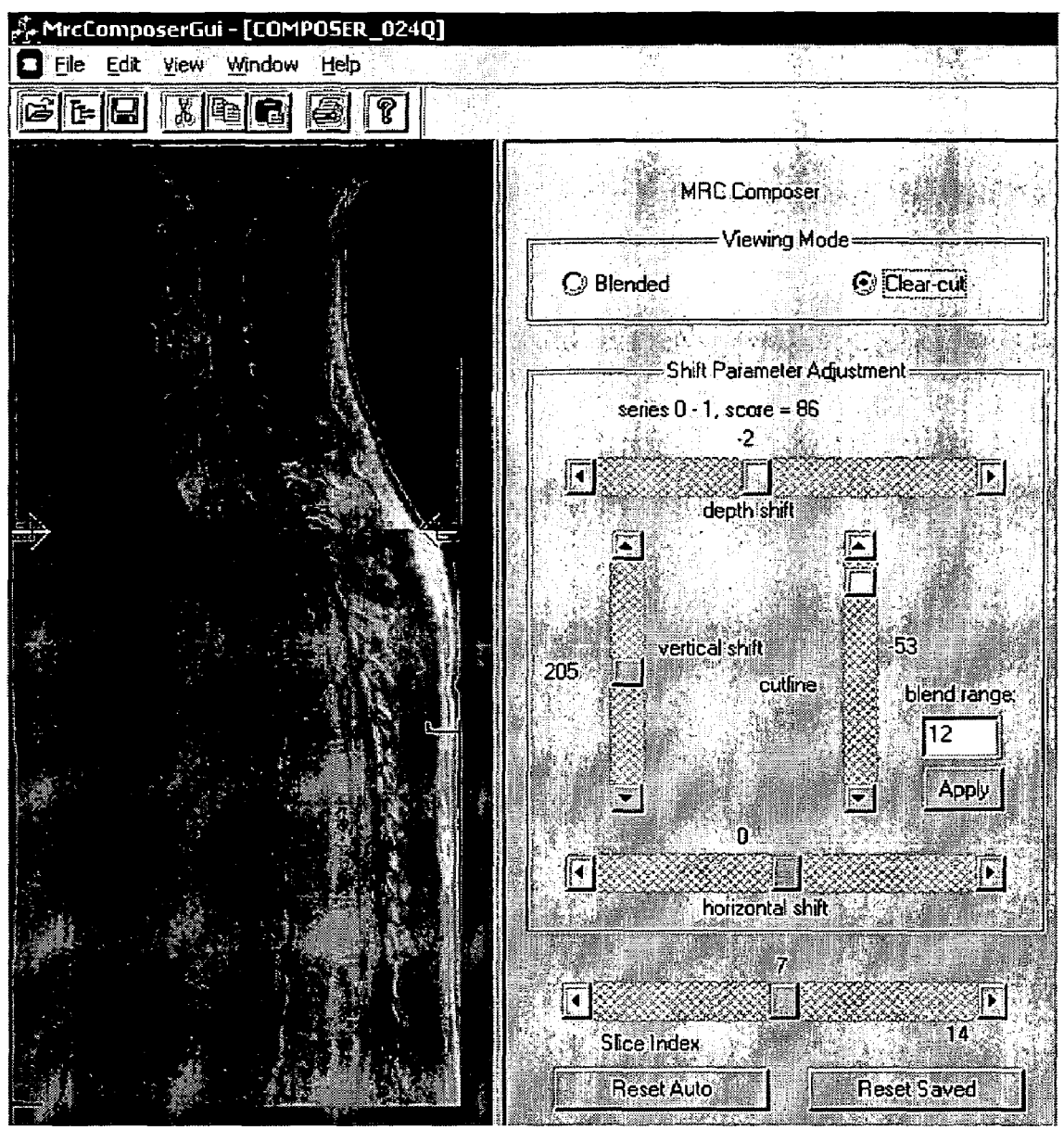
FIG. 5 depicts the result for the c-spine and t-spine, using a focus-adaptive composing method and the dataset of FIGS. 2 and 3.

The differences between the original method and the focus-adaptive method can be further explored by comparing FIGS. 4 and 5. These images represent results for the cervical spine (c-spine) and the thoracic spine (t-spine) in the previous dataset. The image depicted in FIG. 4 was obtained using the original method. It can be seen from the cut-line position, that although the spine is poorly aligned, the bright area at the patient's back is well aligned. Due to the inconsistency caused by image distortion, it is not possible to match both the spine and the bright stripe area at the back. As discussed above, the correlation computation favors matching the large homogeneous areas, and thus this alignment has the highest correlation among all possible alignment combinations in this case. The image depicted in FIG. 5 shows the results obtained using the focus-adaptive method. Because the focus-adaptive method suppressed the bright areas at the edge of the image by putting less weight on it and focused more on the center area where spine is located, the composed result shows a good alignment along the spine, but not at the edge of the image. If the original input images are strongly distorted, the result in FIG. 5 is preferred over that in FIG. 4, because the spine is of more significance to the diagnosis.

Figure 6:
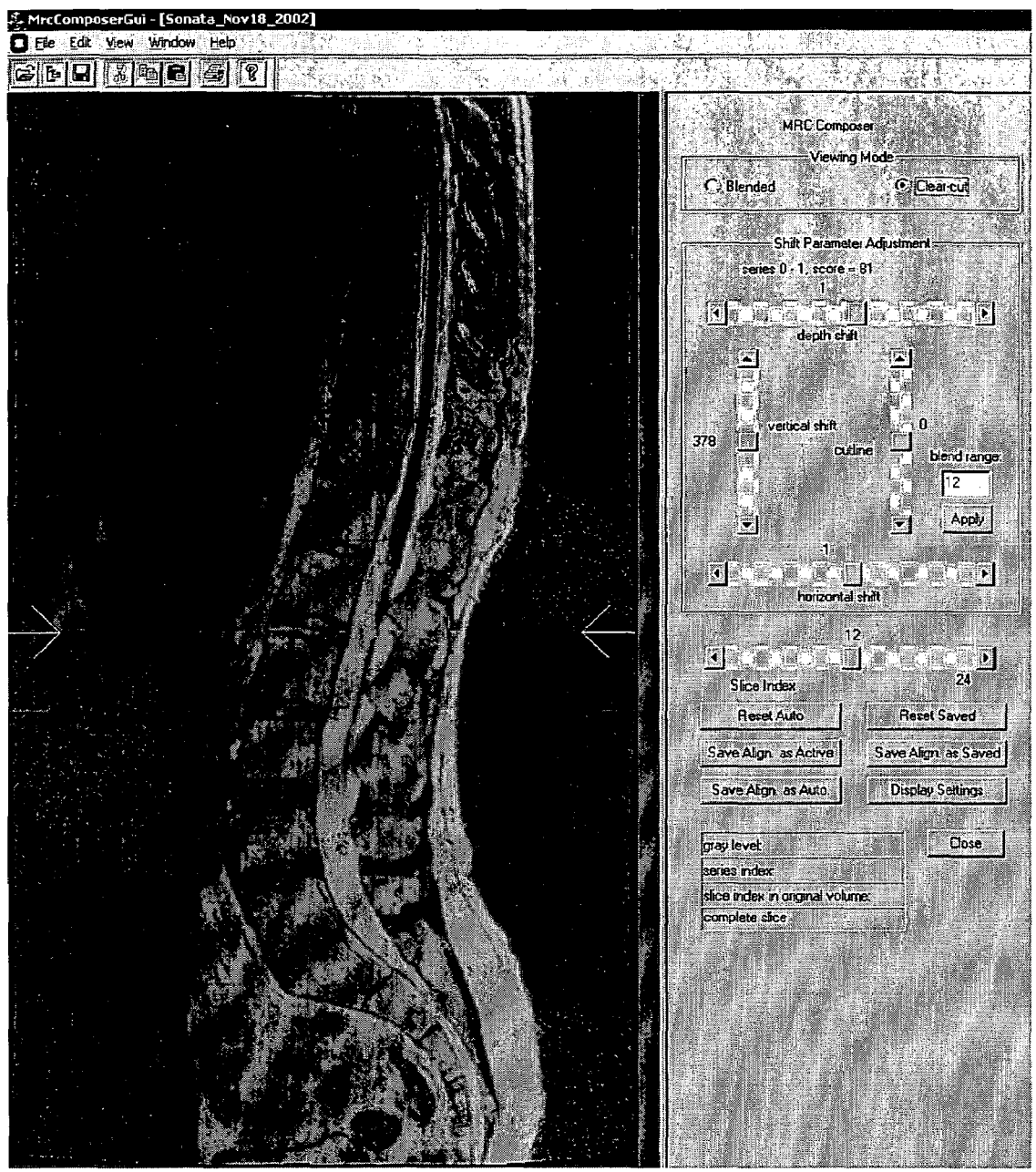
FIG. 6 depicts the result using another dataset composed with the original composing method.
Figure 7:
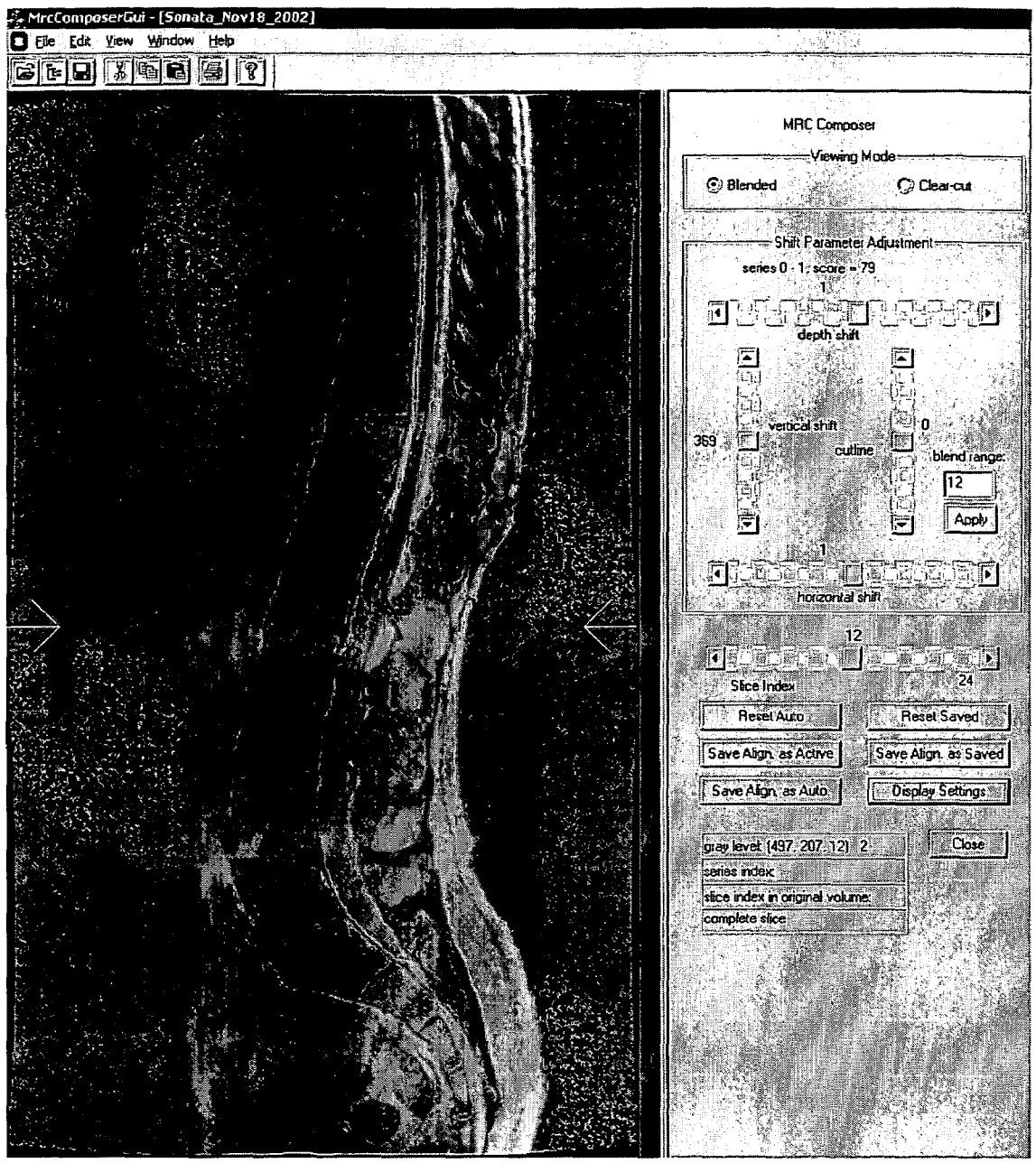
FIG. 7 depicts the result using the dataset as in FIG. 6, but composed with a focus-adaptive method.

FIGS. 6 and 7 present results using another data set. The original method provides the result of a vertical shift as being 378 pixels (FIG. 6). This alignment needs a manual adjustment of 369 pixels, for a difference between automatic and manual adjustments of 9 pixels. However, by applying the focus-adaptive method, the ideal alignment result is obtained, as shown in FIG. 7.

Figure 8:
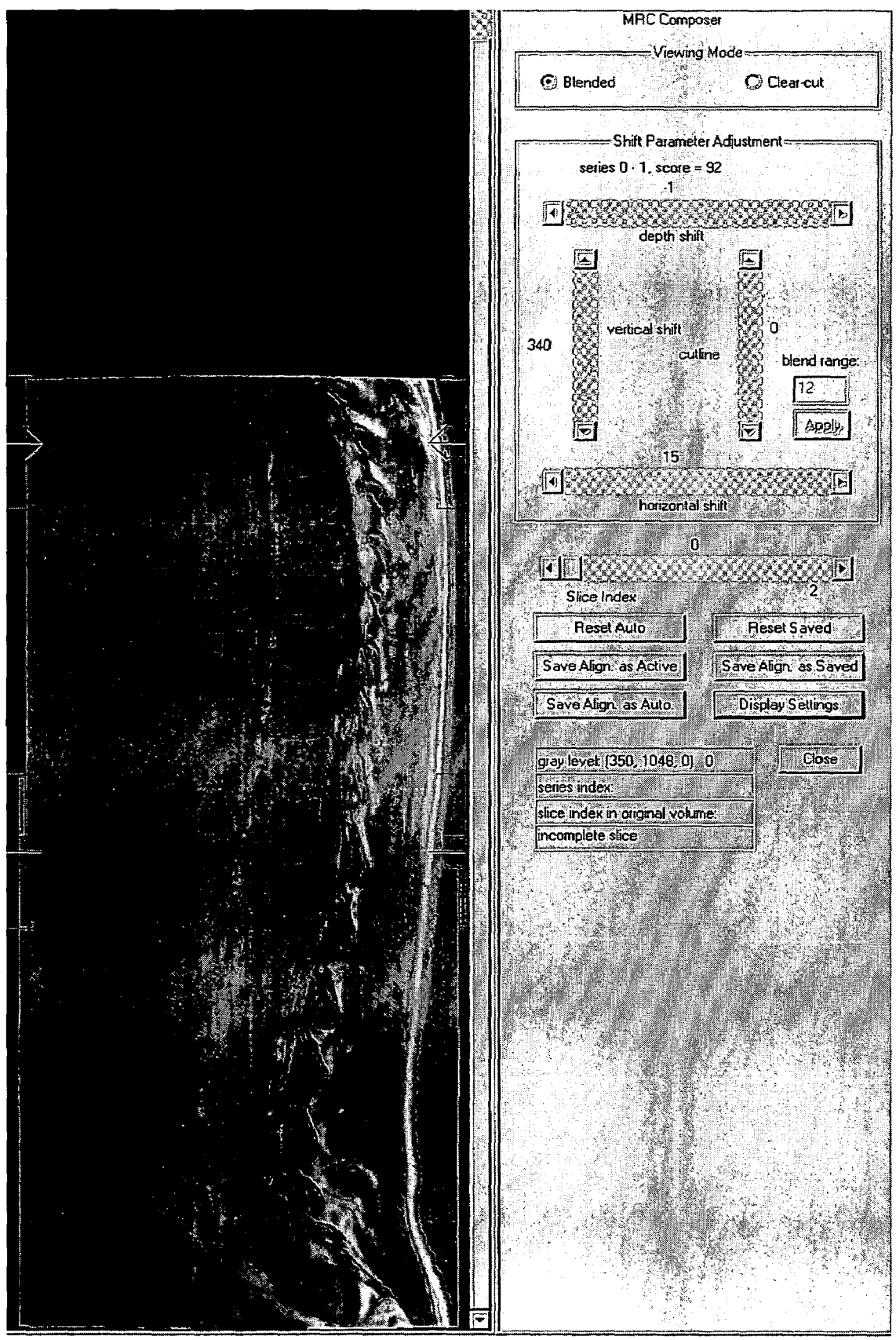
FIG. 8 illustrates the two-slice problem composing result with the original composing method.
Figure 9:
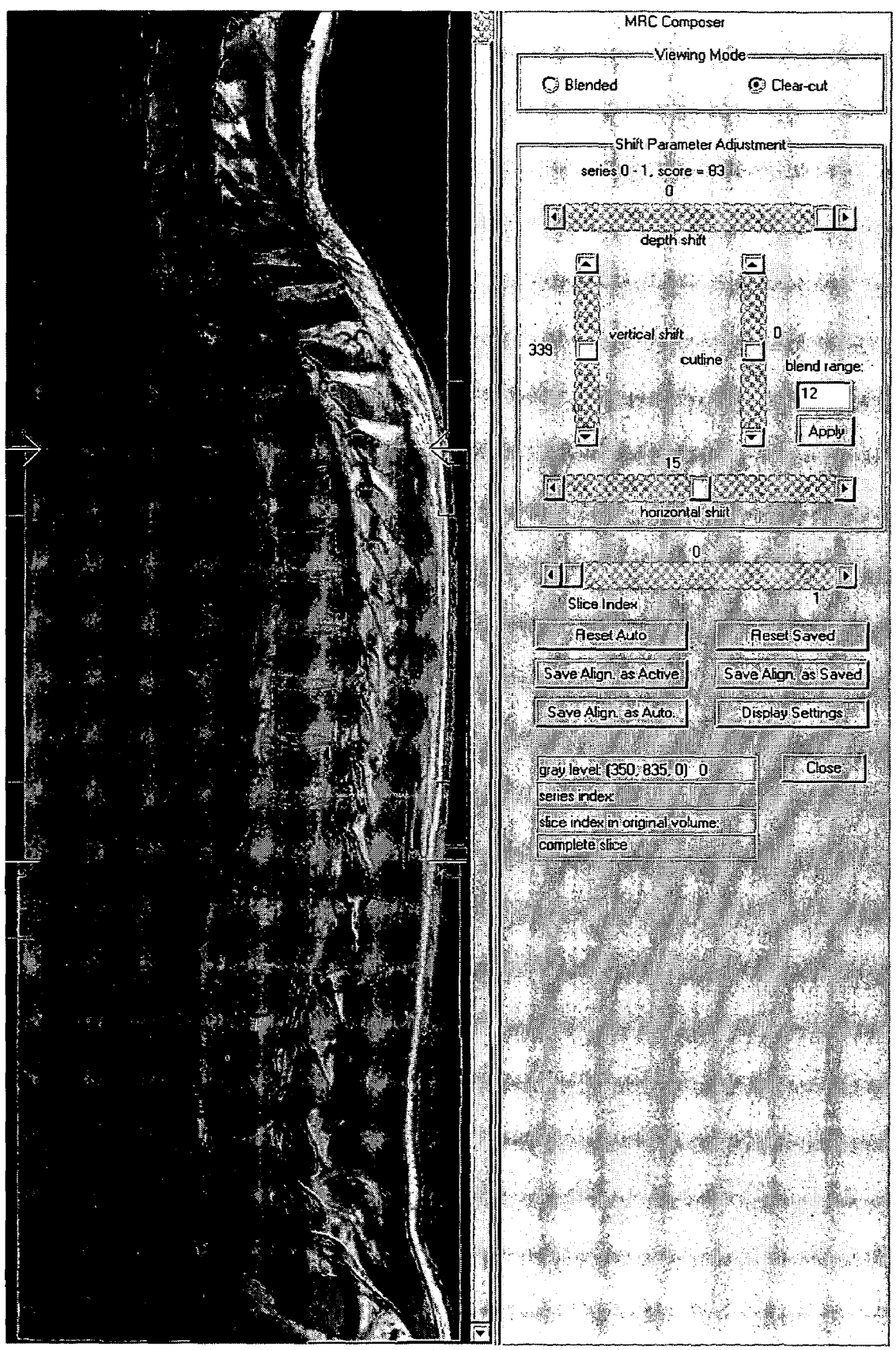
FIG. 9 illustrates the two-slice problem composing result with a focus-adaptive composing method.

Another example uses a test dataset with only two slices in each volume. The most reasonable composing result obtained by manual adjustment should not include incomplete slices, i.e. the optimal depth shift should be 0. However, the original method gives the result shown in FIG. 8, which has incomplete slices, with a depth shift of −1 pixels between the c-spine and the t-spine. The focus adaptive method solved the incomplete slice problem by focusing on the spine area, as shown in FIG. 9. Note that the depth shift is 0 pixels between the c-spine and the t-spine in FIG. 9.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 11:
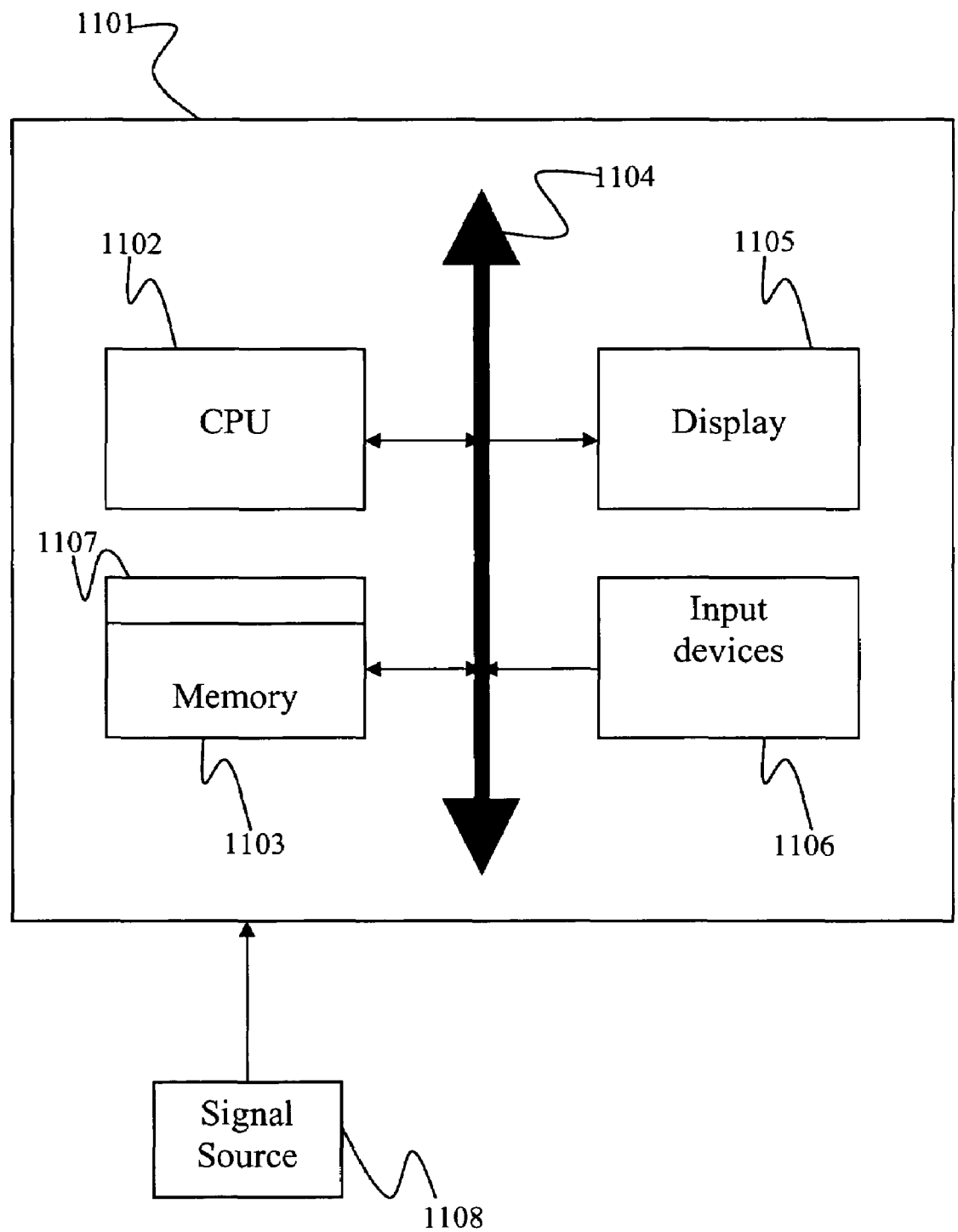
FIG. 11 depicts an exemplary computer system for implementing a preferred embodiment of the invention.

Referring now to FIG. 11, according to an embodiment of the present invention, a computer system 1101 for implementing the present invention can comprise, inter alia, a central processing unit (CPU) 1102, a memory 1103 and an input/output (I/O) interface 1104. The computer system 1101 is generally coupled through the I/O interface 1104 to a display 1105 and various input devices 1106 such as a mouse and a keyboard. The support circuits can include circuits such as cache, power supplies, clock circuits, and a communication bus. The memory 1103 can include random access memory (RAM), read only memory (ROM), disk drive, tape drive, etc., or a combinations thereof. The present invention can be implemented as a routine 1107 that is stored in memory 1103 and executed by the CPU 1102 to process the signal from the signal source 1108. As such, the computer system 1101 is a general purpose computer system that becomes a specific purpose computer system when executing the routine 1107 of the present invention.

The computer system 1101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for aligning a pair of digital images, said method comprising the steps of:
providing a pair of digital images, wherein each said image comprises a plurality of intensities corresponding to a domain of points in a D-dimensional space, and the pair of images present adjacent views of a same object of interest;
applying a weighting function to each image of the pair of images, wherein the weighting function is centered on the object of interest, the weighting function has a maximum value on the object of interest, and the value of the weighting function decreases with increasing distance from the object of interest; and
aligning the pair of images by correlated the weighted intensities on one image with those in the other image.

2. The method of claim 1, wherein each image of the pair of images has an overlap region, and wherein the step of aligning is performed by correlating the weighted intensities in the overlap region of one image with the weighted intensities in the overlap region of the other image.

3. The method of claim 2, wherein the two images are joined into a composed image at a cutline in the overlap regions of the two images.

4. The method of claim 1, wherein the weighting function is applied to an image in the pair of images by multiplying the intensity of a point in the image by the value of the weighting function.

5. The method of claim 1, wherein the object of interest in each image is the spine.

6. The method of claim 1, wherein the object of interest in each image is an arm.

7. The method of claim 1, wherein the object of interest in each image is a leg.

8. The method of claim 1, wherein the images are magnetic resonance images.

9. The method of claim 1, wherein the weighting function is a Gaussian of the form $$P(x)=\exp(-x^2/2\sigma^2)$$

wherein the x-axis is along the image width direction, with the image center line defined as x=0, where P(x)=1.0, and σ=width/6.

10. The method of claim 1, wherein the weighting function is of the form $$P(x)=\sigma^{2n}/(\sigma^{2n}+x^{2n}),$$

wherein the x-axis is along the image width direction, with the image center line defined as x=0, where P(x)=1.0, n can be any positive integer and σ=width/6.

11. The method of claim 1, wherein the weighting function is of the form $$P(x) = -\left(\frac{2}{w}\right)^{2n}\left(x^2 - \left(\frac{w}{2}\right)^2\right)^n,$$

wherein the x-axis is along the image width direction, with the image center line defined as x=0, where P(x)=1.0, n is any positive integer and w is the image width.

12. The method of claim 1, wherein the weighting function is of the form $$P(x)=\{-2x/w+1: 0 \leq x \leq w/2;\ 2x/w+1: -w/2 \leq x < 0\},$$

wherein the x-axis is along the image width direction, with the image center line defined as x=0, where P(x)=1.0, and w is the image width.

13. A program storage device readable by a computer, tangibly embodying a program of instructions executable by the computer to perform the method steps for aligning a pair of digital images, said method comprising the steps of:
provide a pair of digital images, wherein each said image comprises a plurality of intensities corresponding to a domain of points in a D-dimensional space, and the pair of images present adjacent views of a same object of interest;
applying a weighting function to each image of the pair of images, wherein the weighting function is centered on the object of interest, the weighting function has a maximum value on the object of interest, and the value of the weighting function decreases with increasing distance from the object of interest; and
aligning the pair of images by correlated the weighted intensities on one image with those in the other image.

14. The computer readable program storage device of claim 13, wherein each image of the pair of images has an overlap region, and wherein the step of aligning is performed by correlating the weighted intensities in the overlap region of one image with the weighted intensities in the overlap region of the other image.

15. The computer readable program storage device of claim 14, wherein the two images are joined into a composed image at a cutline in the overlap regions of the two images.

16. The computer readable program storage device of claim 13, wherein the weighting function is applied to an image in the pair of images by multiplying the intensity of a point in the image by the value of the weighting function.

17. The computer readable program storage device of claim 13, wherein the object of interest in each image is the spine.

18. The computer readable program storage device of claim 13, wherein the object of interest in each image is an arm.

19. The computer readable program storage device of claim 13, wherein the object of interest in each image is a leg.

20. The computer readable program storage device of claim 13, wherein the images are magnetic resonance images.

21. The computer readable program storage device of claim 13, wherein the weighting function is a Gaussian of the form $$P(x)=\exp(-x^2/2\sigma^2)$$

wherein the x-axis is along the image width direction, with the image center line defined as x=0, where P(x)=1.0, and σ=width/6.

22. The computer readable program storage device of claim 13, wherein the weighting function is of the form $$P(x)=\sigma^{2n}/(\sigma^{2n}+x^{2n}),$$

wherein the x-axis is along the image width direction, with the image center line defined as x=0, where P(x)=1.0, n can be any positive integer and σ=width/6.

23. The computer readable program storage device of claim 13, wherein the weighting function is of the form $$P(x) = -\left(\frac{2}{w}\right)^{2n}\left(x^2 - \left(\frac{w}{2}\right)^2\right)^n,$$

wherein the x-axis is along the image width direction, with the image center line defined as x=0, where P(x)=1.0, n is any positive integer and w is the image width.

24. The computer readable program storage device of claim 13, wherein the weighting function is of the form $$P(x)=\{-2x/w+1: 0 \leq x \leq w/2;\ 2x/w+1: -w/2 \leq x < 0\},$$

wherein the x-axis is along the image width direction, with the image center line defined as x=0, where P(x)=1.0, and w is the image width.

25. A method for aligning a pair of digital images, said method comprising the steps of:
providing a pair of digital images, wherein each said image comprises a plurality of intensities corresponding to a domain of points in a D-dimensional space, the pair of images present adjacent views of a portion of a same object of interest, and each image of the pair of images has an overlap region;
multiplying the intensity of a point in each image of the pair of images by a value of a weighting function, wherein the weighting function is a Gaussian of the form $$P(x)=\exp(-x^2/2\sigma^2)$$

wherein the x-axis is along the image width direction, with the image center line defined as x=0, where P(x)=1.0, and σ=width/6;
aligning the pair of images by correlating the weighted intensities in the overlap region of one image with the weighted intensities in the overlap region of the other image; and
joining the two images into a composed image at a cutline in the overlap regions of the two images.

26. The method of claim 25, wherein the object of interest in each image is the spine.

27. The method of claim 25, wherein the object of interest in each image is an arm.

28. The method of claim 25, wherein the object of interest in each image is a leg.

29. The method of claim 25, wherein the images are magnetic resonance images.

* * * * *